Figure 4:
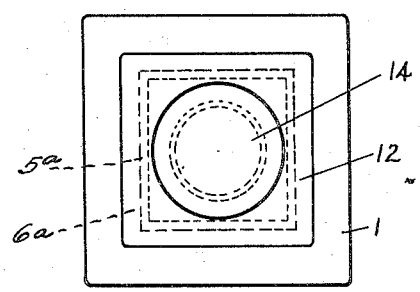

May 8, 1928.

E. L. MESSLER 1,668,567

HOT TOP FOR INGOT MOLDS

Filed Dec. 8, 1926

4 Sheets-Sheet 1

INVENTOR

Eugene L. Messler by William B. Wharton his attorney

May 8, 1928.

E. L. MESSLER 1,668,567

HOT TOP FOR INGOT MOLDS

Filed Dec. 8, 1926  4 Sheets-Sheet 2

INVENTOR
Eugene L. Messler
by William B. Wharton
his attorney

INVENTOR
Eugene L. Messler
by William B. Wharton
his attorney

May 8, 1928.

E. L. MESSLER 1,668,567

HOT TOP FOR INGOT MOLDS

Filed Dec. 8, 1926

4 Sheets-Sheet 4

INVENTOR
Eugene L. Messler
by William B. Wharton
his attorney

Patented May 8, 1928.

1,668,567

UNITED STATES PATENT OFFICE.

EUGENE L. MESSLER, OF PITTSBURGH, PENNSYLVANIA.

HOT TOP FOR INGOT MOLDS.

Application filed December 8, 1926. Serial No. 153,250.

This invention relates to a feeder or hot top for ingot molds.

As is well known in the art, such feeders or hot tops are manufactured of clay, or some other more or less refractory material or composition, and are placed on the ingot mold prior to the operation of pouring the ingot. These hot tops are used not only as a receptacle for the sink head of the ingot, but also serve to keep the metal in a fluid condition during pouring, so that it will feed properly into the mold.

Certain problems are encountered in the manufacture and use of hot tops. One such problem is caused by the fragility of the material of which hot tops have been made, which is apt to lead to their breakage in shipment. Another problem is that most hot tops during a preheating operation, or when they come into contact with metal during pouring are apt to crumble, slag, crack, or spall, and results in the inclusion of particles of the hot top in the ingot. Another problem is due to the fact that a hot top during pouring may slag sufficiently to become attached to the sink head; this possibility necessitating that the hot tops be blocked up on the ingot mold, so that the blocking may be removed after the ingot is poured to permit the top to settle with the steel as in contracts. A still further problem is the fact that when the hot top has a collar which extends into the mold, such collar cannot be made to fit neatly in the mold. Consequently when metal is poured in the hot top to form the ingot proper and the sink head, molten metal may work up between the metal and hot top, and over the top of the mold to produce a hanging ingot, unless pouring is discontinued just as the metal reaches the collar permitting the metal to solidify sufficiently to prevent such overflow of metal.

As stated before, the chief function of a hot top is to provide a good insulating reservoir to retain the heat of the metal, so that it will fit well into the mold. Previously a thoroughly successful material for the hot tops has not been evolved. If the hot top be of too dense a material, such as plastic clay, such material will be too good a conductor of heat to permit the hot top to perform its function satisfactorily. If on the contrary the hot top be made of a relatively porous material, such as slag, this material is not sufficiently bonded to prevent particles scaling off.

In no instance has a hot top previously been produced which is of such material and form that may be used successfully in connection with the pouring of more than one ingot.

One object of the present invention is to provide a hot top of such material that it will not readily be broken during shipment or when placed in position on the ingot mold, and of such composition that it will have high insulating qualities without crumbling, slagging, cracking or spalling when subjected to applied heat or to contact with the molten metal.

Another object of the invention is to provide a hot top of such form that metal which works in between the collar of the hot top and the ingot mold will not run over the top of the mold, and will not solidify in such manner as either to produce a hanging ingot or bind the top to the ingot.

A further object of the invention is to provide a hot top of such composition and form that it may be removed from an ingot mold after formation of the ingot, and used in one or more subsequent operations.

A still further object of the invention is to provide a method of assembling the hot top to the ingot mold which will prevent the escape of metal during pouring or the binding of the hot top to the ingot by the working of metal into space or spaces between the exterior of a relatively long hot top collar and the interior surface of the mold.

Figure 5:
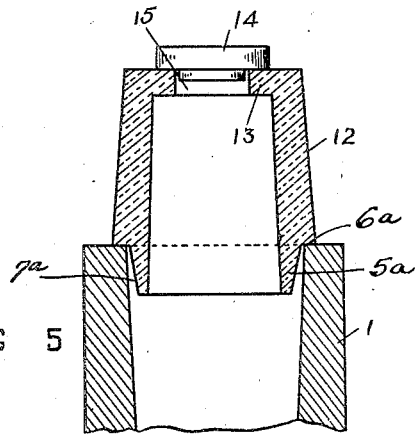
Figure 1:
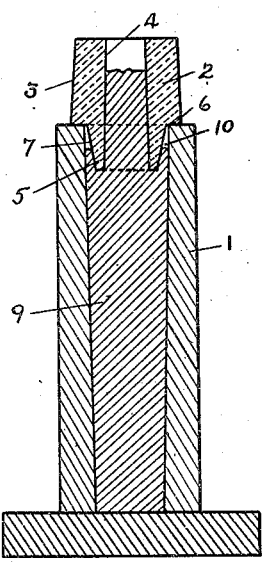
Figure 2:
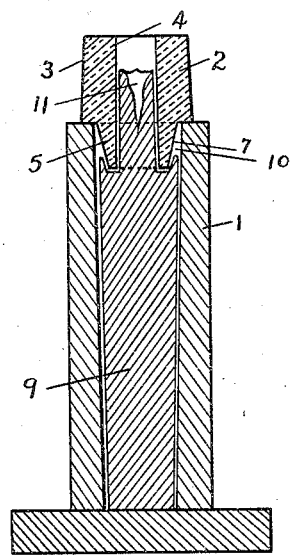
Figure 3:
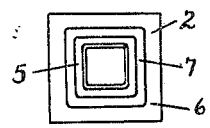
Figure 6:
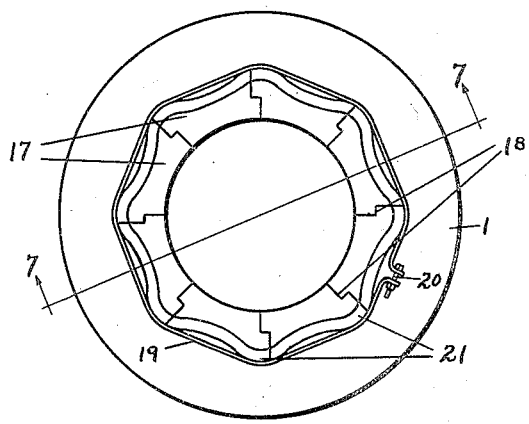
Figure 7:
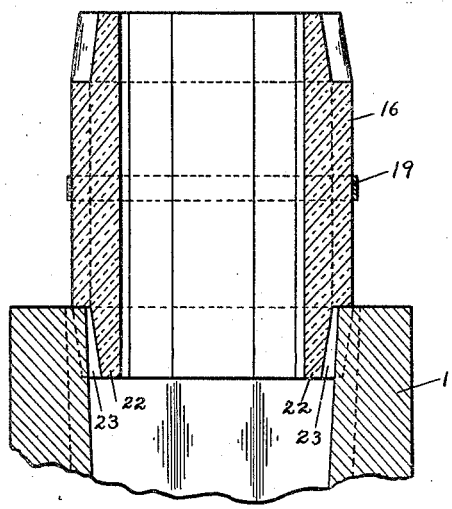
Figure 9:
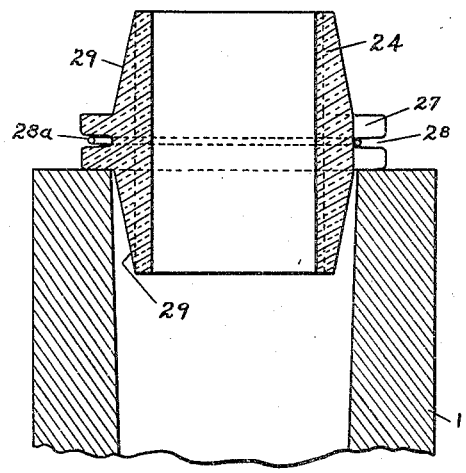
Figure 8:
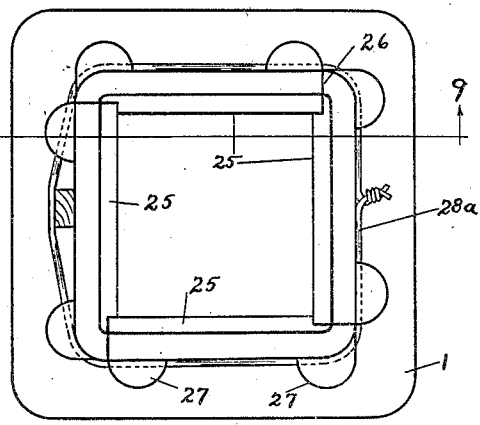
Figure 10:
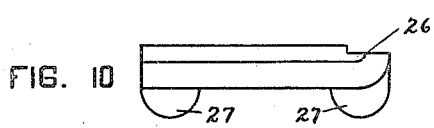
Figures 11, 12:
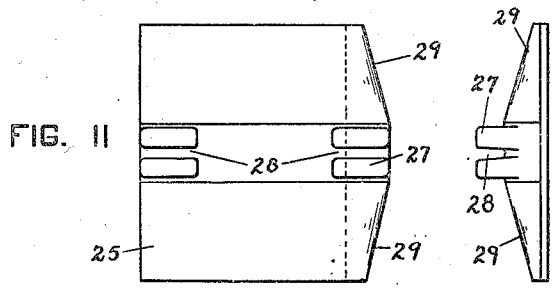
Figure 13:
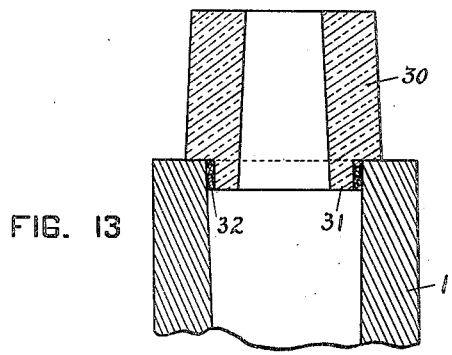
Figure 14:
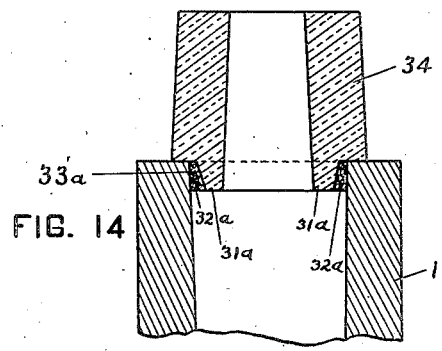
Figure 15:
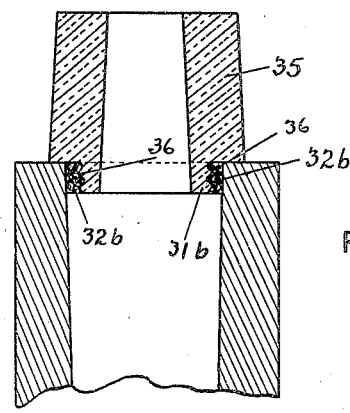
Figure 16:
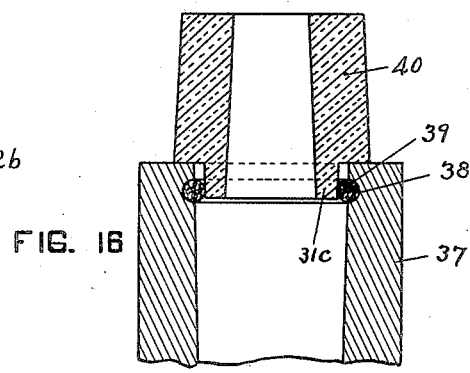
Figure 18:
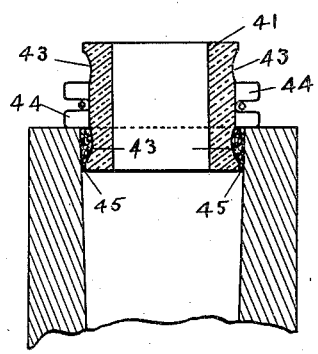
Figure 17:
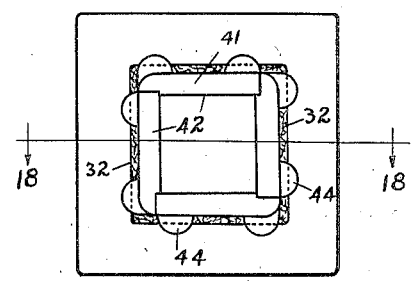
Figure 19:
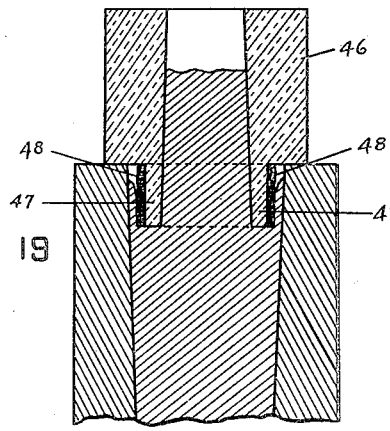
Figure 20:
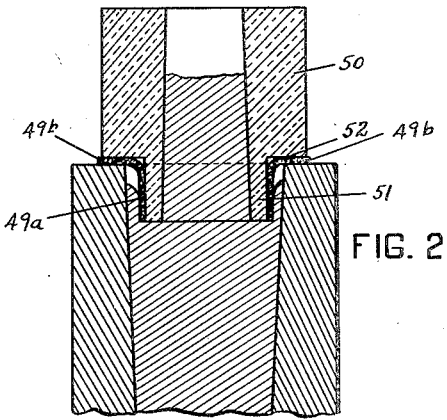
Figure 21:
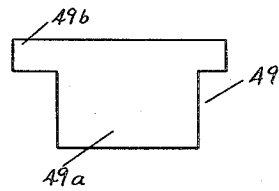
Figure 22:
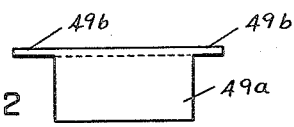
Figure 24:
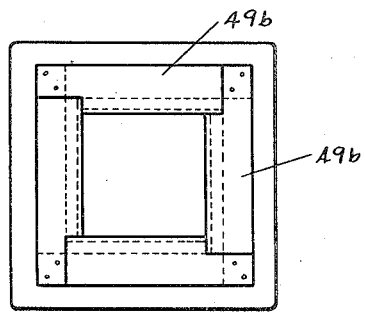
Figure 23:
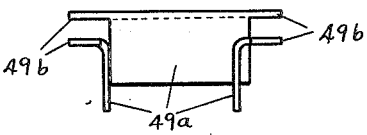

In the accompanying drawings Figure 1 is a vertical sectional view through an ingot mold and through one form of hot top constructed according to the principles of the present invention, showing the position of metal in the mold immediately after operation of pouring the ingot; Figure 2 is a similar view showing the position of the metal of the ingot after it has solidified and the sink head has been formed in the hot top; Figure 3 is a bottom plan view of the hot top shown in Figures 1 and 2; Figure 4 is a top plan view of a modified form of hot top; Figure 5 is a fragmentary sectional view showing the same form of hot top in position on an ingot mold; Figure 6 is a top plan view of a sectional hot top embodying the principles of the present invention; Figure 7 is a vertical sectional view through this modified form of hot top, taken on the line 7—7 Figure 6, and showing this hot top in position on an ingot mold; Figure 8 is a top plan view of another sectional form of hot top, made to embody the principles of the present invention; Figure 9 is a vertical sectional view through this hot top, taken on the line 9—9 of Figure 8, and showing the hot top in position on an ingot mold; Figure 10 is a plan view of one of the sections of the hot top shown in Figures 8 and 9; Figure 11 is a front elevation of such section; Figure 12 is a side elevation thereof; Figure 13 illustrates a method of packing a hot top of well known form in an ingot mold; Figure 14 illustrates the same method used in conjunction with a hot top of the type shown in Figures 1 to 3 of the drawings; Figure 15 illustrates the same method of packing with a hot top constructed with special reference to such method; Figure 16 shows such method conducted in connection with an ingot mold constructed with particular reference thereto; Figure 17 is a top plan view of a hot top arranged to permit packing to be inserted between the mold and the collar of the hot top by forcing it downwardly rather than upwardly into a space between the collar and the mold; Figure 18 is a vertical sectional view on the line 18—18 Figure 17, showing this hot top in position on an ingot mold and packed relatively thereto; Figure 19 is a vertical sectional view through a hot top and the upper portion of an ingot mold, showing a protective packing of paperboard or the like in contact with the outer surface of the hot top collar; Figure 20 is a generally similar view, illustrating a special arrangement of packing to prevent the entry of air between the hot top and the upper surface of the ingot mold; Figure 21 is a side elevation of a blank of paperboard or the like cut to a form suitable for use as shown in Figure 20; Figure 22 is a side elevation showing the upper, or flange, portion of the blank folded over; Figure 23 is an end elevation of two folded blanks, and a side elevation of a third folded blank, illustrating the positioning of blanks on an ingot mold or their assembly into a complete shield; and Figure 24 is a plan view of a complete protecting shield comprising several of the folded blanks, assembled and mutually secured.

In Figures 1 to 3 inclusive of the drawings, reference numeral 1 designates an ingot mold, which may be of any usual or preferred type. The hot top is designated generally by the reference numeral 2. This hot top is formed of refractory material or composition, and is arranged to rest on the upper end of the ingot mold 1. In form this hot top has an upwardly inclined outer surface 3 and an upwardly inclined inner surface 4. The purpose of the inclination inwardly of the hot top is to permit the metal of the ingot to free itself from the top as it shrinks during solidification. The purpose of the upward inclination exteriorly of the hot top is merely to conserve material by avoiding unnecessary thickness in the upper portion of the hot top.

The hot top 2 is provided with a collar 5, which extends a short distance downwardly in the ingot mold, and with a surface 6 which forms a seat to support the hot top on the upper end of the mold. The collar 5 serves to position the hot top in the mold, and to insulate the sink head of the ingot from the mold. The surface or seat 6 serves as a cap, irrespective of a close fit between the collar and mold, to prevent the metal of the ingot from running over the top of the mold. From the surface or seat 6 the outer surface of the collar 5 tapers smoothly downward to the lower end of the collar, leaving an appreciable space between the outer surface of the collar and the inner surface of the ingot mold. The taper of this surface 7 and its relation to the interior surface of the mold is somewhat exaggerated in the drawings for the sake of clearness of illustration.

Figure 1 of the drawings shows the mold and hot top immediately after completion of a pouring operation. At such time the metal 9 of the ingot has worked its way into the space 10 between the collar 5 of the hot top and the interior surface of the mold 1. Due to the gradual contraction of this space 10, however, and to the rapid chilling of the metal against the wall of the mold, there is little tendency for the metal to work through any crevices between the seat 6 and the upper end of the ingot mold caused by irregularities in the upper surface of the mold. Such effect would not only result in binding the hot top to the mold, but would also probably result in the formation of a hanging ingot.

Figure 2 of the drawings illustrates the condition after the metal of the ingot has become solidified, and the sink head 11 has been formed. In this figure of the drawings, the metal forming the sink head 11 is shown as having shrunk away from the upwardly inclined surface 4 of the hot top, so that the hot top is free from the sink head. It also shows the shrinkage of the ingot metal which has worked into the space 10 between the tapered surface 7 of the hot top and the interior surface of the ingot mold. As this metal has contracted in cooling, it has shrunk along the tapered surface 7 in such manner as to free this surface. The tapered surface 7 of the collar serves to free the collar from the metal during shrinkage in a manner which would not be possible if this surface were straight vertically. This freeing of the collar of the hot top from the metal of the ingot permits the hot top to be removed without injury, and to be used in conducting one or more subsequent pouring operations.

Figures 4 and 5 of the drawings illustrate a modified form of hot top 12. This form may be identical with the form illustrated in Figures 1 to 3 in so far as the collar of the hot top and most of the other features thereof is concerned. It is accordingly provided with a seat 6ᵃ to rest on the top of the ingot mold, and a collar 5ᵃ having a tapered outer surface 7ᵃ. It is, however, formed with an integral web, stiffener, or partial closure 13 serving in itself to conserve heat, and to increase the heat insulating qualities of the hot top. If desired, however, a special plug, or closure member 14, may be applied after pouring to close the orifice 15 in the web 13 after the ingot has been poured. The partial closure 13, whether made integral with the vertical wall of the hot top, as shown, or made as a separate member, serves to center the stream of molten metal during teeming of the ingot, and prevents splashing the sides of the mold or the formation of scabby ingots. When integral with the vertical wall of the hot top, it also serves to increase the strength of the hot top as a whole.

Figures 6 and 7 of the drawings illustrate a sectional type of hot top. As shown, this hot top 16 is substantially octagonal in shape, and is formed of a plurality of interlocking sections 17. These sections 17 engage mutually by means of vertical staggered joints 18, to prevent leakage of metal and prevent the formation of a "hanging ingot". The sections are bound together by means of a metallic band 19 disposed adjacent the median line of the hot top. The band 19 is tightened to hold the sections in close engagement by means of a bolt or adjusting screw 20. The most extended portions 21 of each of the sections 17 extend radially outward a sufficient distance to rest upon the upper surface of the ingot mold, and each of the sections is provided with a collar 22 which tapers downwardly to leave a space 23 between such section and the interior surface of the mold. It will be noticed that the structure at both ends of the hot top is identical, so that the hot top may be positioned with either end down to cooperate with the mold. This structure illustrates the adaptation of the tapered collar effect to one type of sectional hot top.

Another form of sectional hot top, providing the tapered collar effect is shown in Figures 8 to 12 inclusive of the drawings. This hot top 24 comprises four sections 25, each of which forms the greater proportion of one side of the hot top and a small portion of another side of the top. These sections 25 also have vertical interlocking faces 26 so arranged as to render the escape of molten metal between the joints of the sections improbable. Each section has adjacent its meridian line lugs 27 having therein notches 28 to receive a wire 28ᵃ for binding the sections together. From this lug 27 the outer surface of the section tapers in opposite directions to provide inclined faces 29. The hot top may be positioned either side up on the ingot mold, and is supported thereon by means of the lugs 27.

As previously stated, Figures 13 to 18 inclusive of the drawings illustrate a method of packing various types of hot top on an ingot mold, in such manner as to additionally insure against the flow of metal over the top of the mold and to additionally insure ready removal of the hot top from the mold.

Figure 13 illustrates a hot top 30, having a collar 31 formed without substantial exterior taper. As it is impossible to secure an exact fit between the collar of the hot top and the interior surface of the ingot mold, there is almost inevitably a small space between the collar and mold. As shown in Figure 13, this space is filled by packing material 32. This packing 32 may be a refractory material, such as asbestos fibre, asbestos rope, clay, or a mixture of clay and asbestos. While this material may be applied by reaching down through the hot top and working it up into the space between the collar and mold, it is, however, preferably applied to the collar before the hot top is placed on the mold.

Figure 14 of the drawings illustrates a similar method of packing a hot top and ingot mold. This hot top 34 may be identical with the hot top 30 of Figure 13, with the exception that the exterior surface 33ᵃ of the collar 31ᵃ is tapered, as in the form of hot top shown in Figures 1 to 3 inclusive of the drawings. In this instance the tapered exterior surface of the collar permits the packing material 32ᵃ to be more readily inserted when the hot top is in position on the ingot mold, and also provides the advantage of the tapered collar structure if no packing is employed. A still further form of hot top 35 is shown in Figure 15 of the drawings. In this modified form the collar 31ᵇ is provided exteriorly with a corrugated surface 36. This corrugated surface 36 assists in maintaining the packing in position, if this packing be applied before the insertion of the collar into the ingot mold, and also insures its retention in position whether it be inserted before or after the hot top is placed in position.

Figure 16 of the drawings illustrates a method of packing a hot top, in which the ingot mold itself is arranged to assist in securing the packing material in position. As shown in this figure of the drawings, the interior surface of the ingot mold 37 is provided with an annular indentation 38 for the reception of the asbestos rope, or other suitable packing material 39. The hot top 40 is shown as having a collar 31ᶜ identical with the collar 31 of the hot top 30 shown in Figure 13 of the drawings, but the form of this collar may be that of any of the other figures or any other suitable form. When the hot top is placed in position on the ingot mold, the collar 31ᶜ, entering the mold, compresses the packing material 38 and forms an effectual seal. While only one indentation in the ingot mold for the reception of packing material is shown, a plurality of such indentations may be formed in the mold to provide a corrugated surface at this point.

The modified form of hot top illustrated in Figures 17 and 18 of the drawings is particularly designed to facilitate the insertion and compression of packing material after the hop top has been placed in position on the ingot mold. This hot top 41 is formed of a plurality of interengaging sections 42 similar to the sections of the hot top 24 shown in Figures 8 to 12 of the drawings. These sections however are provided with concavities 43 on each side of lugs 44. When the hot top is placed in position on the ingot mold, the concavities of the sections form a continuous channel which is open upwardly of the mold. The portion of the hot top wall at the end of the concavity 43 forms a ring 45 which is relatively close to the interior surface of the ingot mold.

With the hot top 41 in this position, the space formed by concavities 43 which lie within the ingot mold may be filled with any suitable packing mold. The advantage of this form of hot top is that it facilitates the insertion of the packing material to form a closed joint between the hot top and the ingot mold.

Instead of a refractory material, a suitable combustible material may generally be employed. Such material may be paperboard, or the like. As shown in Figure 19 of the drawings, this material may merely serve as a temporary protection to the outer surface of the hot top collar, without any attempt being made to completely fill the space between the exterior surface of the hot top collar and the interior surface of the ingot mold. Since, however, such material is compressible, it may be used of a greater thickness than the width of such space and compressed. For example, the packing material of Figure 13 may consist of this compressed paperboard.

As shown in Figure 19, the hot top 46 has a collar 47 substantially similar to the collar 31 of hot top 30, shown in Figure 13. Surrounding this collar 47 is a thickness 48 of paperboard or the like. This protective covering, although it burns away rapidly, is usually effective to prevent chilling of the ingot metal against the exterior surface of the collar until the chilling effect of the ingot mold itself has caused solidification of the ingot at this point. When this occurs, the hot top collar is of course free from the ingot metal after solidification. The rate at which this covering burns may be retarded by providing an air tight packing, as shown in Figure 13, or by the arrangement shown in Figures 20 to 24 inclusive.

In such arrangement a plurality of blanks 49, such as those shown in Figure 21, are cut out. These blanks comprise each a body portion 49ᵃ and a flange portion 49ᵇ, which latter may be bent into a plane at right angles to the body portion, as shown in Figure 21. When so bent a plurality of these members may be placed individually in the position shown in Figure 21. In such position the body portion 49ᵃ of each of the members lies next the collar 51 of the hot top 50, and the flange portion 49ᵇ of the member lies between the top of the ingot mold and the seat 52 of the hot top. Owing to the compressibility of the material, the weight of the hot top itself will, by pressing upon the flange 49ᵇ, form a substantially air tight seal between the ingot mold and the hot top.

As it is desirable to economize in the time required to prepare an ingot mold for the pouring, or teeming, operation, it is in general advantageous to assemble several of the members 49, as shown in Figures 23 and 24, so that a complete protective covering for the hot top collar may be placed in position on the ingot mold before the hot top is placed in position. As shown in these figures, the corners of the flanges 49ᵇ are permitted to overlap, and are glued together, or otherwise mutually attached. Figure 24 also serves to illustrate the position of the members 49 on an ingot mold even though these members are not mutually connected prior to being placed in position thereon.

Instead of sections of packing material, as shown and described, paperboard, asbestos board, or the like may be molded initially into a form substantially similar to the assembly shown in Figure 24. When the material is so molded, the packing collar may be quickly placed in position, and may be applied to an integral hot top prior to its shipment.

This arrangement, by excluding air from the space between the hot top collar and the ingot mold, serves to retard combustion of the protective covering and causes this material to char slowly rather than to burn rapidly.

In order to further facilitate stripping of the top after solidification of an ingot, it is desirable to whitewash all surfaces of the hot top which are to come into contact with the molten ingot metal.

All forms of the hot top illustrated in the various figures may be made of a special composition which has the advantages of a relatively high fusion point, relatively low conductivity of heat, and sufficient strength to avoid breakage of the hot top during shipment and use. Such desirable composition comprises flint, clay, grog (granulated or powdered brick), and plastic clay. The proportions of these ingredients may be varied within fairly wide limits in accordance with the temperature to which the hot top is to be subjected, and to the probable shocks which it must withstand during shipment and use. A desirable composition may be secured by utilizing the grog in the proportion of ten to twenty per cent of the total composition, flint, clay in the proportion of forty to sixty per cent of the total composition, and plastic clay as the remaining ingredient. In addition to the fact that it serves as a satisfactory heat insulator, a hot top made of this composition has higher refractory qualities, and greater toughness, than where plastic clay is the sole ingredient. This composition of the hot top assists in permitting the hot top to be removed from an ingot mold and used in successive operations. This is for the reason that the hot tops so made do not in general suffer deterioration from breakage, shipping, or from spalling of the hot top before or during a pouring operation. When, therefore, the hot top of this composition is so formed that it is not bound to an ingot mold by the metal of the ingot, it may in general be removed uninjured from the ingot mold.

What I claim is:

1. A hot top for ingot molds comprising a vertically extending wall of refractory material forming the body of the hot top, and a web having an orifice therein integral with the wall at the upper end thereof.

2. A hot top for ingot molds comprising a vertically extending wall of refractory material forming the body of the hot top, a web having an orifice therein integral with the wall at the upper end thereof, and a closure of refractory material having a portion arranged to rest on said web and a centering portion arranged to enter the orifice therein.

3. A hot top for ingot molds comprising a vertically extending wall of refractory material forming the body of the hot top, and a substantially horizontal wall of refractory material having an orifice therein providing a partial closure at the upper end of said vertically extending wall.

4. A hot top for ingot molds comprising a vertically extending wall of refractory material forming the body of the hot top, a substantially horizontal wall of refractory material having an orifice therein providing a partial closure at the upper end of said vertically extending wall, and a closure member of refractory material having a portion arranged to rest on said substantially horizontal wall and a centering portion arranged to enter the orifice therein.

In witness whereof I hereunto set my hand.

EUGENE L. MESSLER.